COOK & WEBB.
Grain-Drill.

No. 46,544. Patented Feb. 28, 1865.

Witnesses:
Edward S. Jewett
Edward S. Halsey

Inventor:
Stephen D. Cook
Henry J. Webb

UNITED STATES PATENT OFFICE.

STEPHEN D. COOK, OF LIMA, AND HENRY J. WEBB, OF DEXTER, MICH.

IMPROVEMENT IN SEEDING-MACHINES.

Specification forming part of Letters Patent No. 46,544, dated February 28, 1865.

*To all whom it may concern:*

Be it known that we, STEPHEN D. COOK, of Lima, in the county of Washtenaw and State of Michigan, and HENRY J. WEBB, of the village of Dexter, and same county and State, have invented a new and useful Improvement for Broadcast-Seeding Machines; and we do hereby declare that the following is a full, clear, and exact description of the construction and operation of the same, reference being had to the annexed drawings, making a part of this specification, in which—

Figure 1:
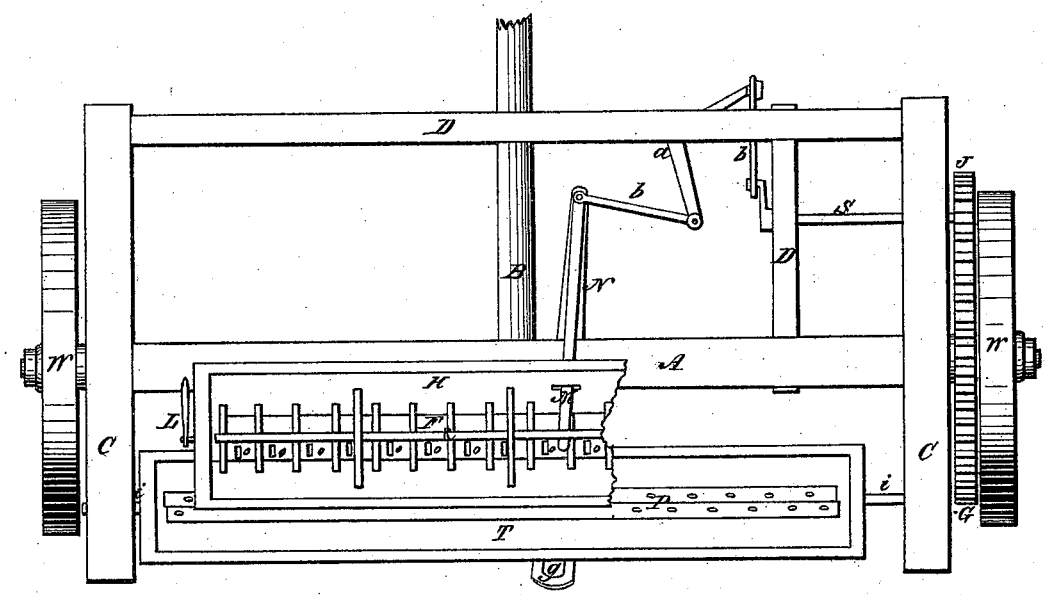
Figure 2:
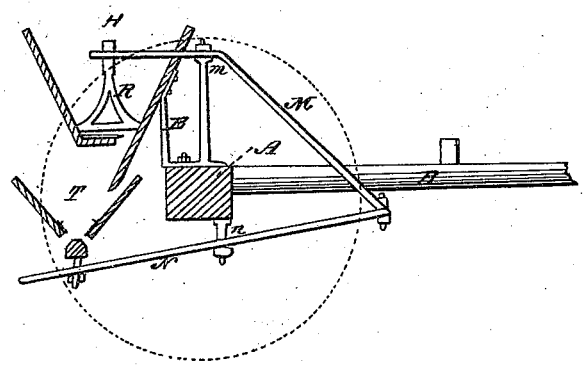

Figure 1 is a plan view; Fig. 2, a transverse section.

Similar letters of reference indicate corresponding parts in both figures.

The object of our improvement is to insure a more correct and certain gaging and distribution of the seed; and it consists in the employment of a stationary hopper and rake in connection with an oscillating "delivering-trough;" and the better to enable others skilled in the art to construct and use our invention, we will now proceed to describe it.

Our machine is mounted on a pair of ordinary wheels, W W, running loose on an axle, A, usually of wood, and to which the draft-tongue B or a pair of shafts is attached. To the axle and tongue a rectangular wooden frame consisting of the overhanging side pieces, C C, and girts D D is firmly connected by framing and bolting. Above and partially behind the axle a stationary hopper, H, for the reception of the seed is attached to two standards, one of which is seen at E. The hopper is of the ordinary form with angular sides and narrow flat bottom provided with perforations o o o, &c., for the passage of the seed. A slide or gage plate, F, with corresponding openings, lies over the fast bottom, which is operated by the driver through the intervention of a rod and lever, L, so as to gage the openings for the requisite quantity of seed per acre. We have represented the hopper as broken off to exhibit the distributing-trough below, and for the same reason have not shown the hinged cover, with which our hoppers are usually provided.

A reciprocating rake, R, composed of cross-slats connected with a central bar, is placed at the bottom of our hopper, and by means to be presently described is caused to traverse each opening so as to agitate the seed immediately above the apertures and insure a punctual discharge. These slats may be of wood or metal in such form as to best overcome resistance.

The side of the hopper next the axle is prolonged below to form a shelf or apron to conduct the seed to the trough below (indicated at T) for distribution over the ground. The distributing-trough is simply two hard-wood boards nailed or screwed to two stout V-shaped heads furnished with long journals $i\ i$, which play loosely in bearings in the side pieces, C C, of the frame. One or more ranges of holes are made on each side of the interior angle of the trough, and the seed passes through them from corresponding openings in a gage-plate, P, which should be so adjusted as to prevent the seed as it comes from the hopper accumulating beyond a proper extent. We will complete the description of our machine while giving the *modus operandi*, which is as follows:

The hopper 4 is first filled with seed and the gage-plates adjusted, as described. When the team is started and the wheels W W revolve a spur-wheel, G, attached to one of them, actuates a pinion, J, on the crank-shaft S, and through the intervention of the rock-shaft $a$ and connecting-rods $b\ b$ communicates a vibratory movement to a pair of levers, M N, which have their fulcrums, respectively, at $m$ and $n$. The lever M, passing through a slot in the side of the hopper and through the cross-bar of the rake R, gives a reciprocating rectilinear motion to the same, by which the seed is stirred incessantly over the apertures $o\ o\ o$, &c., and discharged evenly through into the trough T, which, being connected at the center to the end of the lever N, is also worked back and forth with a longer travel, sufficient freedom being left between the hangers to allow the journals $i\ i$ to play in their bearings endwise. This motion of the trough scatters the seed through the holes in the gage-plate and sides with the greatest possible uniformity over the field. As the trough must be left free to oscillate, to the end that it will always maintain a vertical position on uneven ground, there is a slot (marked $g$) in the end of the lever N, through which the connecting-bolt passes, and the length of the stroke is rendered uniform by so tapering the said slot that the lost motion will compensate for the change of position in the trough while ascending a rise of ground.

We are aware that "agitators" for preventing seed from clogging are not new, and also that seed has been sown broadcast from a box by a vibratory motion; but we do not believe that seed has ever been before measured out by a rake into a distributer having a uniform shake in a constant vertical position, the great advantage of which is to distribute the seed with as much uniformity over undulating ground as over a level prairie.

We claim—

The employment of the rake R, in combination with the shaking and oscillating seed-distributing trough T, operated substantially as and for the purpose specified.

STEPHEN D. COOK.
HENRY J. WEBB.

Witnesses:
EDWARD S. JEWETT,
EDWARD S. HALSEY.